(12) United States Patent
Childs et al.

(10) Patent No.: US 7,222,143 B2
(45) Date of Patent: May 22, 2007

(54) SAFELY RESTORING PREVIOUSLY UN-BACKED UP DATA DURING SYSTEM RESTORE OF A FAILING SYSTEM

(75) Inventors: Philip Lee Childs, Raleigh, NC (US); Daryl Carvis Cromer, Apex, NC (US); Howard Jeffrey Locker, Cary, NC (US); Michael T. Vanover, Raleigh, NC (US); Steven R. Welch, Gilroy, CA (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 457 days.

(21) Appl. No.: 10/720,491

(22) Filed: Nov. 24, 2003

(65) Prior Publication Data

US 2005/0114411 A1  May 26, 2005

(51) Int. Cl.
G06F 17/30 (2006.01)
(52) U.S. Cl. .............................. 707/204; 707/3; 707/8; 707/10; 707/203; 707/205
(58) Field of Classification Search ........ 707/200–205, 707/8, 3, 10; 711/162–163; 713/188; 726/24
See application file for complete search history.

(56) References Cited

U.S. PATENT DOCUMENTS

| | | | |
|---|---|---|---|
| 5,455,932 A | 10/1995 | Major et al. ................ | 395/489 |
| 5,675,725 A * | 10/1997 | Malcolm ....................... | 714/6 |
| 5,745,669 A | 4/1998 | Hugard et al. ......... | 395/182.01 |
| 6,381,694 B1 | 4/2002 | Yen ............................... | 713/2 |
| 6,385,707 B1 * | 5/2002 | Maffezzoni ................. | 711/162 |
| 6,477,629 B1 | 11/2002 | Goshey et al. ............. | 711/162 |
| 6,526,418 B1 | 2/2003 | Midgley et al. ........... | 707/204 |
| 6,535,998 B1 | 3/2003 | Cabrera et al. .............. | 714/15 |
| 6,594,780 B1 | 7/2003 | Shen et al. ................... | 714/15 |
| 6,625,623 B1 * | 9/2003 | Midgley et al. ........... | 707/204 |
| 2002/0059498 A1 | 5/2002 | Ng et al. .................... | 711/112 |
| 2002/0112135 A1 | 8/2002 | Playe ......................... | 711/162 |
| 2002/0152333 A1 | 10/2002 | Nam ............................ | 710/1 |
| 2003/0033536 A1 * | 2/2003 | Pak et al. ................... | 713/188 |
| 2003/0061456 A1 | 3/2003 | Ofek et al. ................. | 711/162 |
| 2003/0074378 A1 | 4/2003 | Midgley et al. ........... | 707/204 |
| 2005/0055559 A1 * | 3/2005 | Bucher ....................... | 713/188 |

* cited by examiner

Primary Examiner—Cam-Y Truong
(74) Attorney, Agent, or Firm—Winstead PC

(57) ABSTRACT

A method, computer program product and system for restoring previously un-backed up data during a system restore. A computing system may include a locked partition in its storage medium to store an alternate operating system and backed-up files. The alternate operating system may determine which files have been modified since the most recent backup and run a virus scan on those modified files. The alternate operating system may copy the modified files with no detected viruses as well as those modified files with a detected virus but cleaned by the virus scan. The backup files in the locked partition that have been modified since the most recent backup operation may be replaced with these uncorrupted modified files. In this manner, the system may be able to recover files since the most recent backup while ensuring at least in part that the restored files do not contain any viruses.

7 Claims, 3 Drawing Sheets

SAFELY RESTORING PREVIOUSLY UN-BACKED UP DATA DURING SYSTEM RESTORE OF A FAILING SYSTEM

TECHNICAL FIELD

The present invention relates to the field of data processing systems, and more particularly to safely restoring previously backed up and un-backed up data during system restore of a failing system.

BACKGROUND INFORMATION

To protect data information in a data processing system from being lost, there is a need for a regular process in which the data is saved or backed up on a data storage media where the data storage media may be located either internally or externally from the data processing system. This regular process of saving data is often referred to as performing a "backup."

In the case of files being corrupted due to hardware trouble and malfunctions or accidental infection by a computer virus or a computer worm, the data processing system may be restored to the state of the last backup using the back up files. However, upon restoring the data processing system to the state of the last backup, any files that have been modified since the last backup may not be able to be recovered.

Further, it is possible that one of the backed up files unknowingly contained a virus or a worm. Consequently, when the data processing system is restored using the backed up files, the system may still be contaminated and the files may still be corrupted.

Therefore, there is a need in the art to be able to recover files that have been modified since the last backup as well as a need in the art to ensure at least in part that the restored files do not contain any viruses or worms.

SUMMARY

The problems outlined above may at least in part be solved in some embodiments by a locked partition in a storage medium of a computing system storing an alternate operating system and backed-up files. The locked partition may be accessed only by the alternate operating system and not by the primary operating system. In this manner, the alternate operating system and the backed-up files may be ensured at least in part of being virus free. Further, the alternate operating system determines which files have been modified since the most recent backup and runs a virus scan on those modified files. The modified files that are corrupted may be uncorrupted by the virus scan. The alternate operating system may then copy the modified files with no detected viruses as well as those modified files with a detected virus but cleaned by the virus scan. The backup files in the locked partition that have been modified since the most recent backup operation may be replaced with these uncorrupted modified files. In this manner, the system may be able to recover files since the most recent backup while at least in part ensuring that those modified files do not contain any viruses.

In one embodiment of the present invention, a method for restoring previously un-backed up data during a system restore may comprise the step of storing backup files in a locked partition of a storage device. The method may further comprise starting the restoration of the system. The method may further comprise reading other partitions of the storage device to determine which files have been modified since the most recent backup operation. The method may further comprise running a virus scan on the files determined to be modified. The method may further comprise uncorrupting the modified files containing a virus that can be uncorrupted. The method may further comprise copying uncorrupted modified files. The method may further comprise replacing the backup files in the locked partition of the storage device that have been modified since the most recent backup operation with the uncorrupted modified files.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and system for restoring previously un-backed up data during a system restore. In one embodiment of the present invention, a computing system may include a locked partition in its storage medium to store an alternate operating system and backed-up files. The locked partition may be accessed only by the alternate operating system and not by the primary operating system. In this manner, the alternate operating system and the backed-up files may be ensured at least in part of being virus free. Further, the alternate operating system determines which files have been modified since the most recent backup and runs a virus scan on those modified files. The modified files that are corrupted may be uncorrupted by the virus scan. The alternate operating system may then copy the modified files with no detected viruses as well as those modified files with a detected virus but cleaned by the virus scan. The backup files in the locked partition that have been modified since the most recent backup operation may be replaced with these uncorrupted modified files. In this manner, the system may be able to recover files since the most recent backup while at least in part ensuring that those modified files do not contain any viruses.

In the following description, numerous specific details are set forth to provide a thorough understanding of the present invention. However, it will be apparent to: those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
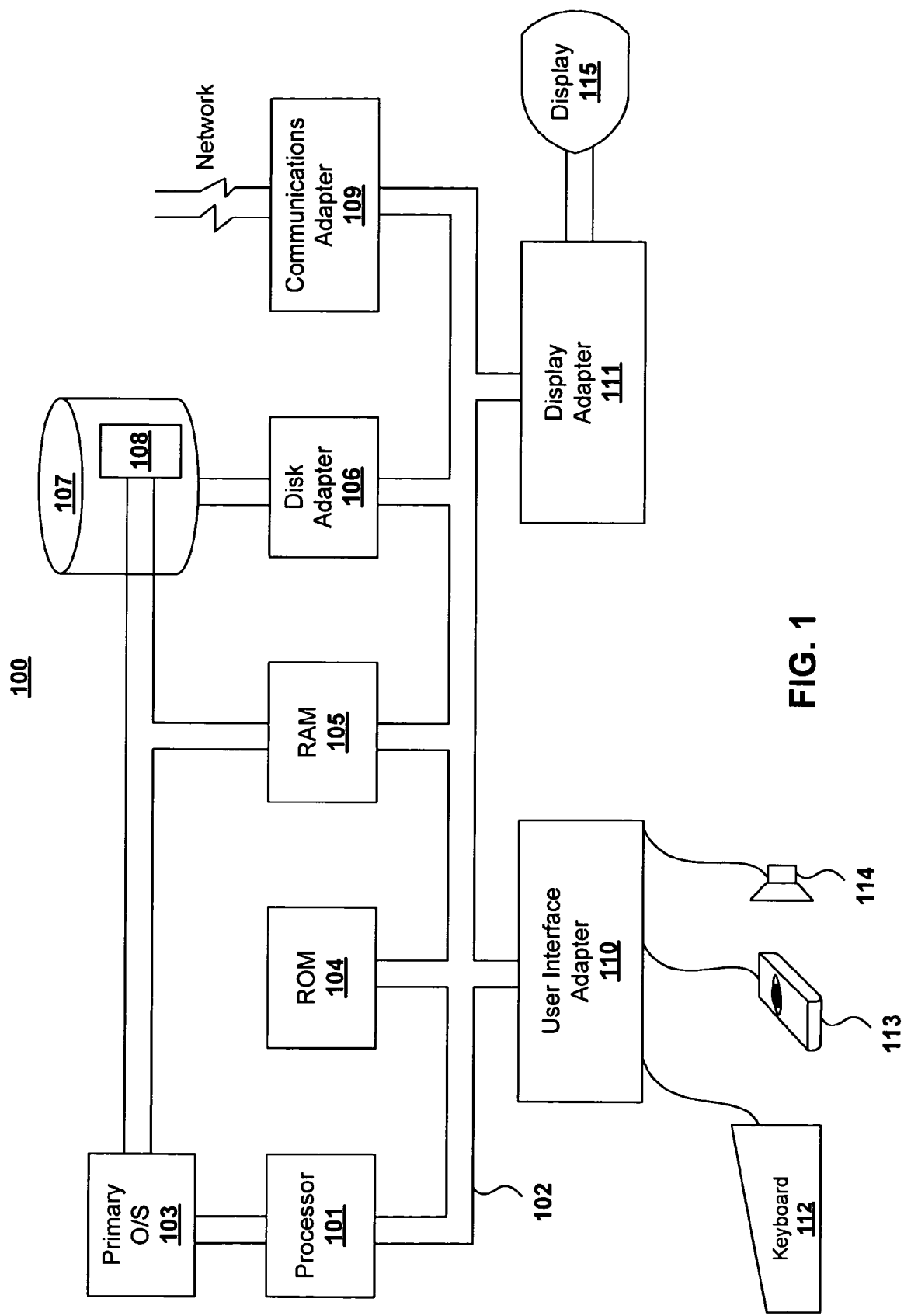
FIG. 1 illustrates a computing system in accordance with an embodiment of the present invention.

FIG. 1—Computing System

FIG. 1 illustrates an embodiment of the present invention of a hardware configuration of a computing system 100 for practicing the present invention. Referring to FIG. 1, computing system 100 may have a processor 101 coupled to various other components by system bus 102. A primary operating system 103 may run on processor 101 and provide control and coordinate the functions of the various components of FIG. 1. Read only memory (ROM) 104 may be coupled to system bus 102 and include a basic input/output system ("BIOS") that controls certain basic functions of computing system 100. Random access memory (RAM) 105 and disk adapter 106 may also be coupled to system bus 102. Disk adapter 106 may be an integrated drive electronics ("IDE") adapter that communicates with a disk unit 107, e.g., disk drive.

In one embodiment, disk unit 107 may comprise a designated partition 108 configured to store an alternate operating system and the backup files. The backup files are copies of files stored in other partitions of disk unit 107 at a particular time. The designated partition 108 may be a "locked partition" where primary operating system 103 is not able to write information to partition 108. Primary operating system 103 may be defined to not be able to access locked partition 108 as the information needed to access locked partition 108 is not available to primary operating system 103. Only the alternate operating system in partition 108 may run applications, e.g., virus scan, from partition 108, download files, e.g., virus template update, to partition 108 or copy files to serve as backup copies in partition 108. By having the alternate operating system and backup files stored in locked partition 108, the alternate operating system and backup files may be at least in part be ensured of being virus free. Further, the alternate operating system and backup files may at least in part be ensured of being virus free as the backup files stored in partition 108 are first scanned for viruses by alternate operating system and are only stored in partition 108 if virus-free as discussed below in association with FIG. 2. In another embodiment, the backup files and the alternate operating system may be stored in a locked partition in a storage medium located remotely from computing system 100. For example, the alternate operating system and backup files may be stored in a locked partition of a hard drive (not shown) in a server (not shown) coupled to computing system 100.

Further, partition 108 may store an application configured to restore previously un-backed up data during a system restore as discussed further below in association with FIG. 2. It should be noted that software components including primary operating system 103, the alternate operating system stored in partition 108 and the application configured to restore previously un-backed up data during a system restore may be loaded into RAM 105 which may be computing system's 100 main memory.

Returning to FIG. 1, communications adapter 109 may also be coupled to system bus 102. Communications adapter 109 may interconnect bus 102 with an outside network enabling computing system 100 to communicate with other such devices. Input/Output devices may also be connected to system bus 102 via a user interface adapter 110 and a display adapter 111. Keyboard 112, mouse 113 and speaker 114 may all be interconnected to bus 102 through user interface adapter 110. Event data may be inputted to computing system 100 through any of these devices. A display monitor 115 may be connected to system bus 102 by display adapter 111. In this manner, a user is capable of inputting to computing system 100 through keyboard 112 or mouse 113 and receiving output from computing system 100 via display 115 or speaker 114.

Implementations of the invention include implementations as a computer system programmed to execute the method or methods described herein, and as a computer program product. According to the computer system implementations, sets of instructions for executing the method or methods may be resident in the random access memory 105 of one or more computer systems configured generally as described above. Until required by computing system 100, the set of instructions may be stored as a computer program product in another computer memory, for example, in disk unit 107. Furthermore, the computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

As stated in the Background Information section, in the case of files being corrupted due to hardware trouble and malfunctions or accidental infection by a computer virus or a computer worm, the data processing system may be restored to the state of the last backup using the back up files. However, upon restoring the data processing system to the state of the last backup, any files that have been modified since the last backup may not be able to be recovered. Further, it is possible that one of the backed up files unknowingly contained a virus or a worm. Consequently, when the data processing system is restored using the backed up files, the system may still be contaminated and the files may still be corrupted. Therefore, there is a need in the art to be able to recover files that have been modified since the last backup as well as a need in the art to ensure that the restored files do not contain any viruses or worms. A method for recovering files that have been modified since the last backup as well as ensuring that the restored files do not contain any viruses or worms are discussed below in association with FIGS. 2A–B.

Figure 2A:
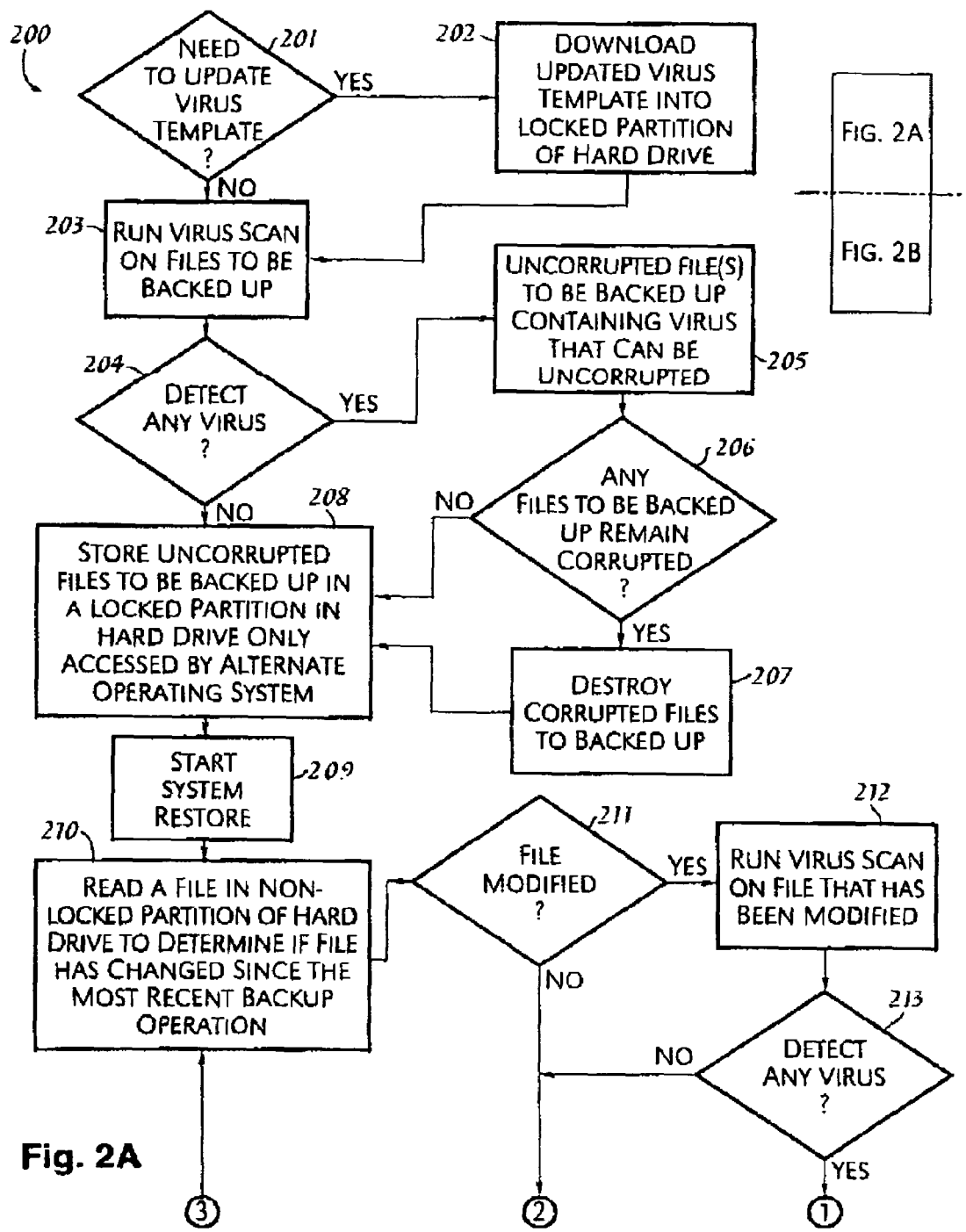
FIG. 2A–B are a flowchart of a method for restoring previously un-backed up data during a system restore in accordance with an embodiment of the present invention.
Figure 2B:
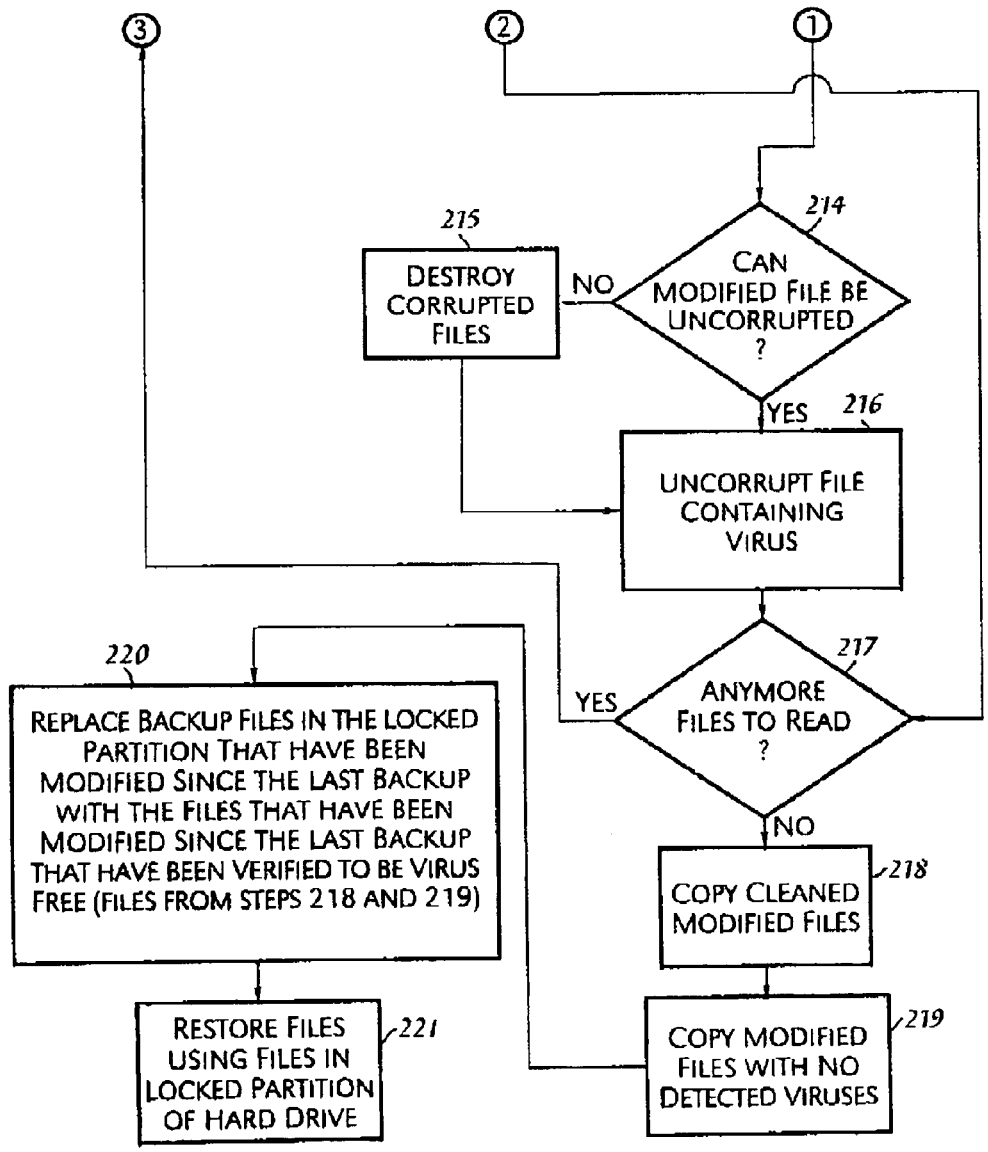

FIGS. 2A–B—Method for Restoring Previously Un-Backed Up Data During a System Restore.

FIGS. 2A–B are a flowchart of one embodiment of the present invention of a method 200 for restoring previously un-backed up data during a restore of system 100 (FIG. 1). Steps 201–208 of method 200 describe the process of backing up data in partition 108 and steps 209–221 of method 200 describe the process of restoring previously un-backed up data during a restore of system 100.

Referring to FIGS. 2A, in conjunction with FIG. 1, in step 201, a determination is made by the alternate operating system in partition 108 as to whether there is a need to update the virus template. That is, the alternate operating system in partition 108 determines if the version of the virus template is outdated and needs to be updated. If so, then, in step 202, the alternate operating system in partition 108 downloads the updated virus template into partition 108.

Upon downloading the updated virus template or if the virus template did not need to be updated, then, in step 203, the alternate operating system in partition 108 runs a virus scan on the files to be backed up.

In step 204, the alternate operating system in partition 108 determines if the virus scan detected any viruses or worms. It is noted that the term "virus," as used herein, includes the concept of worms. If the virus scan detected any viruses, then, in step 205, the alternate operating system in partition 108 uses the virus scan software to uncorrupt those file(s) containing a virus.

In step 206, the alternate operating system in partition 108 determines if any of the files to be backed up remain corrupted. If so, then, in step 207, the alternate operating system in partition 108 destroys those corrupted files.

Upon destroying those corrupted files or if none of the files to be backed up remain corrupted or if none of the files to be backed up contained a virus, then, in step 208, the alternate operating system in partition 108 stores the uncorrupted files to be backed up in locked partition 108 that may only be accessed by the alternate operating system. In an alternative embodiment, the alternate operating system and uncorrupted backup files may be stored in a locked partition of a storage device, e.g., hard drive, located in a remote device, e.g., server, coupled to system 100. It is noted that even though the following description describes the alternate operating and backup files as residing within locked partition 108 of computing system 100 that the principles of the present invention may be applied to the embodiment of the alternate operating system and backup files residing in a locked partition of a storage device located remotely from computing system 100.

In step 209, the restoration of system 100 is started. In step 210, the alternate operating system in partition 108 reads a file located in one of the non-locked partitions of disk unit 107 to determine if the file has changed since the most recent backup operation.

In step 211, the alternate operating system in partition 108 determines if the file read is modified since the most recent backup. Changed files may be identified by techniques such as comparing the modification date associated with the file with a record of the modification date stored during the previous backup.

If the file read by the alternate operating system has been modified since the most recent backup, then, in step 212, the alternate operating system in partition 108 runs a virus scan on the modified file.

In step 213, the alternate operating system in partition 108 determines if the virus scan detected any viruses. Referring to FIG. 2B, if the virus scan detected any viruses, then, in step 214, the alternate operating system in partition 108 determines if the modified file can be uncorrupted.

If so, then, in step 215, the alternate operating system in partition 108 uses the virus scan software to uncorrupt the modified file detected with a virus. Otherwise, in step 216, the alternate operating system in partition 108 destroys the corrupted modified file.

Upon destroying the corrupted modified file in step 215 or if the modified file did not contain a virus or if the file read in step 210 (FIG. 2A) was not modified or upon uncorrupting the modified file that contained a virus in step 216, then, in step 217, the alternate operating system in partition 108 determines if there any more files to be read in the non-locked partitions of disk unit 107. If so, then, in step 210 (FIG. 2A), the alternate operating system in partition 108 reads another file located.

If there are no more files to read in the non-locked partitions of disk unit 107, then, in step 218, the alternate operating system in partition 108 copies the cleaned modified files. That is, the alternate operating system in partition 108 copies those modified files that were detected to contain a virus but have been uncorrupted.

In step 219, the alternate operating system in partition 108 copies the modified files with no detected viruses.

In step 220, the alternate operating system in partition 108 replaces the backup files that have been modified in partition 108 since the last backup with the files that have been modified since the last backup that have been verified to be virus free (files copied in steps 218–219).

In step 221, the alternate operating system in partition 108 restores the files in system 100 using the backup files in partition 108.

As stated above, by having the alternate operating system stored in partition 108, the alternate operating system may at least in part be ensured of being virus free. By having the alternate operating system determine which files have been modified since the most recent backup and run a virus scan on those modified files, system 100 may be able to recover files since the most recent backup while ensuring at least in part that those modified files do not contain any viruses.

It is noted that method 200 may include other and/or additional steps that, for clarity, are not depicted. It is further noted that method 200 may be executed in a different order presented and that the order presented in the discussion of FIG. 2 is illustrative. It is further noted that certain steps in method 200 may be executed in a substantially simultaneous manner.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A system, comprising:
   a processor;
   a first operating system running on said processor;
   a storage device coupled to said processor, wherein said storage device comprises a locked partition configured to store a second operating system and backup files, wherein said locked partition is accessed only by said second operating system; and
   a memory unit coupled to said processor, wherein said memory unit is operable for storing a computer program for restoring previously un-backed up data during a system restore;
   wherein said processor, responsive to said computer program, comprises:
   circuitry operable for starting restoration of said system;
   circuitry operable for reading other partitions of said storage device to determine which files have been modified since most recent backup operation;
   circuitry operable for running a virus scan on files determined to be modified;
   circuitry operable for uncorrupting modified files containing a virus that can be uncorrupted;
   circuitry operable for copying uncorrupted modified files; and
   circuitry operable for replacing backup files in said locked partition of said storage device that have been modified since most recent backup operation with said uncorrupted modified files.

2. The system as recited in claim 1, wherein said processor further comprises:
   circuitry operable for restoring files of said system with said backup files stored in said locked partition of said storage device.

3. The system as recited in claim 1, wherein said processor further comprises:

circuitry operable for destroying modified files containing a virus that cannot be uncorrupted.

4. The system as recited in claim 1, wherein said processor further comprises:

circuitry operable for downloading an updated virus template into said locked partition of said storage device if a virus template needed to be updated.

5. The system as recited in claim 1, wherein said circuitry operable for copying uncorrupted modified files comprises:

circuitry operable for copying modified files with no detected viruses; and circuitry operable for copying modified files with a detected virus but cleaned by said virus scan.

6. The system as recited in claim 1, wherein said processor further comprises:

circuitry operable for running said virus scan on files to be backed up prior to storing said backup files in said locked partition of said storage device; and circuitry operable for uncorrupting said files to be backed up containing a virus that can be uncorrupted prior to storing said backup files in said locked partition of said storage device;

wherein said backup files that are stored in said locked partition of said storage device are said files to be backed up with no detected virus and said files to be acked up with a detected virus but cleaned by said virus scan.

7. A system, comprising:

a first computing system comprising:

a processor;

a first operating system running on said processor; and a memory unit coupled to said processor, wherein said memory unit is operable for storing a computer program for restoring previously un-backed up data during a system restore; and a storage device coupled to said first computing system, wherein said storage device comprises a locked partition configured to store a second operating system and backup files, wherein said locked partition is accessed only by said second operating system; and wherein said processor, responsive to said computer program, comprises:

circuitry operable for starting restoration of said system;

circuitry operable for reading other partitions of said storage device to determine which files have been modified since most recent backup operation;

circuitry operable for running a virus scan on files determined to be modified;

circuitry operable for uncorrupting modified files containing a virus that can be uncorrupted;

circuitry operable for copying uncorrupted modified files; and circuitry operable for replacing backup files in said locked partition of said storage device that have modified since most recent backup operation with said uncorrupted modified files.

* * * * *

UNITED STATES PATENT AND TRADEMARK OFFICE
CERTIFICATE OF CORRECTION

| | | |
|---|---|---|
| PATENT NO. | : 7,222,143 B2 | Page 1 of 1 |
| APPLICATION NO. | : 10/720491 | |
| DATED | : May 22, 2007 | |
| INVENTOR(S) | : Childs et al. | |

It is certified that error appears in the above-identified patent and that said Letters Patent is hereby corrected as shown below:

Claim 6, Column 7, line 28, delete "acked" and insert --backed--.

Signed and Sealed this

Thirty-first Day of July, 2007

JON W. DUDAS
*Director of the United States Patent and Trademark Office*